No. 667,052. Patented Jan. 29, 1901.
W. A. ALLEN.
BRAKE SHOE.
(Application filed July 24, 1900.)
(No Model.)
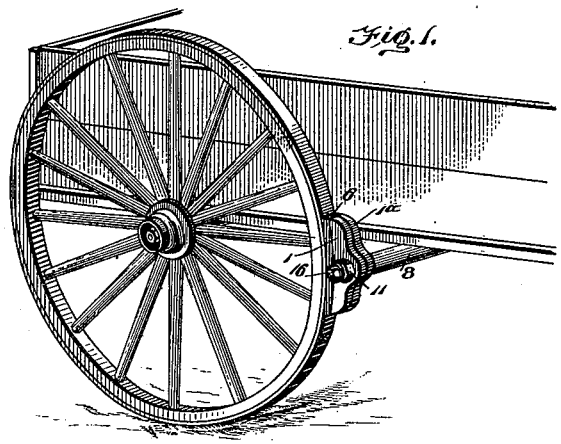
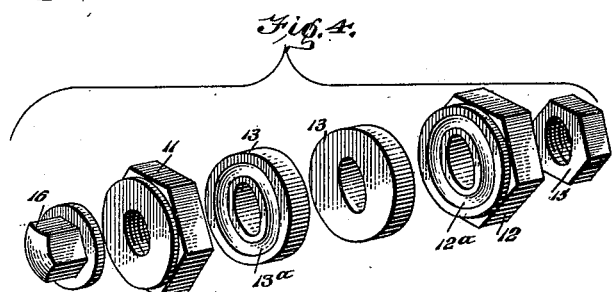
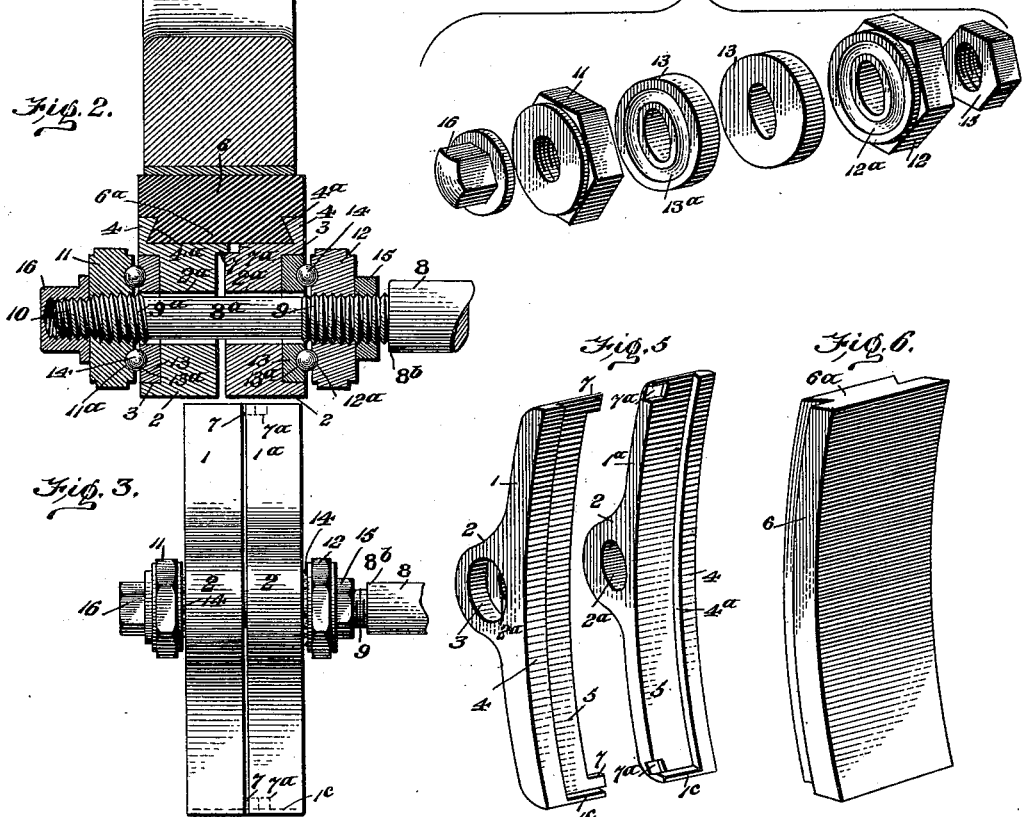
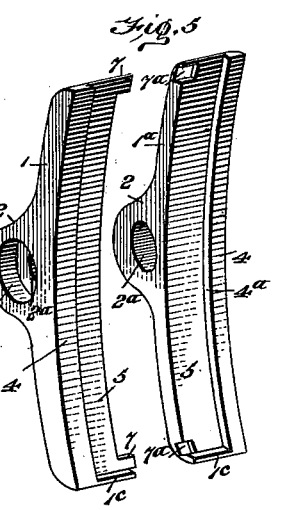
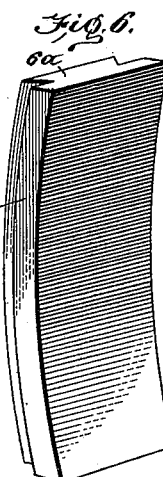
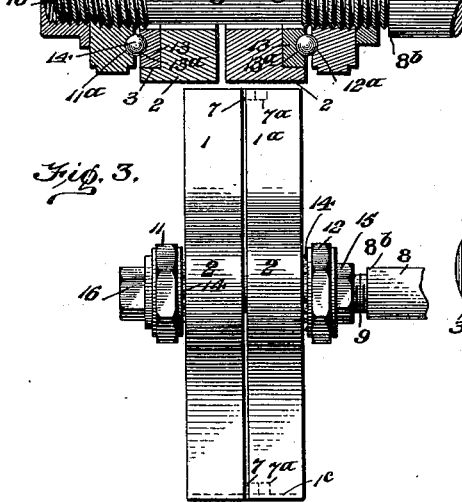
WITNESSES:
H. S. Dieterich
John E. Burch
INVENTOR
W. A. Allen.
BY
Fred G. Dieterich & Co.
ATTORNEYS

UNITED STATES PATENT OFFICE.

WILLIAM ALONZO ALLEN, OF BILLINGS, MONTANA, ASSIGNOR OF ONE-HALF TO WILLIAM O. ALLEN, OF SAME PLACE.

BRAKE-SHOE.

SPECIFICATION forming part of Letters Patent No. 667,052, dated January 29, 1901.

Application filed July 24, 1900. Serial No. 24,676. (No model.)

*To all whom it may concern:*

Be it known that I, WILLIAM ALONZO ALLEN, residing at Billings, in the county of Yellowstone and State of Montana, have invented a new and Improved Brake-Shoe, of which the following is a specification.

This invention has for its purpose to provide a simple, inexpensive, and effectively-operating brake-shoe; and it comprehends in its general construction a sectional body adapted to clamp and retain a detachable wear or gripping block formed of hard rubber, leather, or other yielding bearing material, the said body portion also having a means for quickly adjusting the several sections forming the said body, whereby to permit of a ready removal of the gripping-block and the substitution of a new block without removing the body portion from the brake-shoe-holding rod or shaft.

In its complete make-up my invention embodies, in connection with the sectional body portion, a novel construction of supporting-shaft, upon which the body member is held to rock, whereby the shoe will the more readily accommodate itself to the wheel, and suitable clamping devices mounted upon the shaft and coöperatively operating upon the sectional body members in such manner as to tightly clamp the friction or gripping block in position and at the same time support the braking-shoe upon the shaft to rock freely thereon.

In the accompanying drawings, in which like numerals indicate like parts in all the views, Figure 1 illustrates my improved brake-shoe as applied for use. Fig. 2 is a horizontal section of the same, taken on the line 2 2 of Fig. 3. Fig. 3 is a rear elevation of the same. Fig. 4 is a detail view of the several clamp-nuts and washers hereinafter referred to. Fig. 5 is a view of the two sections forming the body portion separated, and Fig. 6 is a detail view of the detachable gripping-block hereinafter referred to.

In carrying out my invention I form the body portion of the shoe into longitudinal half-sections 1 1$^a$ of like construction, the two sections forming opposites, whereby when closed tightly together they have the shape of the ordinary brake-shoe. Each section 1 is bent on an arc of a circle, and centrally the rear face is enlarged to form a hub portion 2, having a transverse circular aperture 2$^a$ and a countersunk recess 3 on its outer face surrounding the aperture 2$^a$, the purpose of which will presently appear. The outer end of the front face of each section 1 has a flange 4, formed with an undercut or dovetailed face 4$^a$, whereby when the two sections 1 1$^a$ are adjusted as shown in Figs. 2 and 3 a recess 5, having dovetailed edges, is provided to receive the dovetailed back flange 6$^a$ of the wear or gripping block 6. The block 6 is preferably made of hard rubber, of leather, or other similar yielding material, and its front face is curved upon an arc to suit the wheel with which it is intended to engage. To prevent the brake-block 6 pulling down out of the sections 1 1, the lower ends of such sections have inturned flanges 1$^c$ 1$^c$. (See Fig. 5.)

To brace the two sections 1 1$^a$ and also to disseminate the strain thereon, the opposite extremity of one section has lateral flanges 7, adapted to close into recesses 7$^a$ in the adjacent edge of the opposite section, as best shown in Fig. 2.

8 indicates the brake shaft or rod, the outer end of which terminates in a spindle 8$^a$, having a thread portion 9 at its inner end adjacent the shoulder part 8$^b$ of the shaft, it also having a threaded portion 9$^a$ at its outer end, which end terminates in a supplemental threaded spindle-section 10 of a reduced diameter, the purpose of which will presently appear.

It will be noticed by reference to Fig. 2 that the sections 1 are mounted to move freely upon the spindle 8$^a$, and to facilitate such free movement and yet provide a simple means for tightly clamping the sections 1 1$^a$ against the bearing-block 6 ball-bearings are interposed between the clamp-nuts 11 12 and sides of the sections 1, and to provide a simple and easily-constructed combined ball-bearing and clamping mechanism I employ detachable bearing-disks 13 13, one for each recess 3, said disks being centrally apertured to slide freely over the spindle 8 and provided upon their outer faces with a ball race or groove 13$^a$. The clamp-nuts 11 12, respectively, engage the threaded portions 9 9$^a$ of the spindle, and the inner face of each nut 11 12 has a ball-race 11ª 12ª, which races coact with the grooves in their coincident disk members 13.

14 designates the bearing-balls, and 15 a jam-nut for holding the clamp-nut 12 to its adjusted position.

16 is a cap-nut that engages the supplemental spindle 10 and acts as a jam for the clamp-nut 11.

From the foregoing description, taken in connection with the accompanying drawings, it is thought the advantages of my invention will readily appear. By constructing the same of two parts, as described, and clamping them together in the manner shown the wear-block will be held in a vise-like grip and the shoe supported to swing freely upon the shaft 8 to adapt itself to the wheel and lock the same with much less pressure than is possible when the shoe has a fixed connection with the shaft.

My form of brake-shoe in its application is practically noiseless, and in case the wearing-block 6 becomes worn a new one can be quickly inserted without removing the sections 1 1 from the shaft, which operation is effected by simply adjusting the clamp-nuts 11 12 to permit the sections 1 being spread out sufficiently to pull out the block 6 and insert a new one, which can be quickly clamped by adjusting the nuts back again.

Having thus described my invention, what I claim, and desire to secure by Letters Patent, is—

1. A brake-shoe, comprising a pair of longitudinal sections, each having an apertured hub portion upon the rear face, and an edge flange 4, having undercut edges, the extremities of one section having each a lateral lug, the coincident faces of the opposite sections having recesses to receive said lugs, the two sections opposing each other and adapted when fitted upon the brake rod or shaft to form a shoe-body having a longitudinal dovetailed recess in its front face; a wear-block having a dovetailed flange and slidable endwise therein, the body being held to rock freely upon the rod or shaft, and means for clamping the two sections against the wear-block, as specified.

2. In a brake-shoe of the character described, the combination with the brake rod or shaft, said shaft having a spindle formed with a thread portion upon its inner end and a thread portion upon its outer end, the outer end terminating in a supplemental externally-threaded spindle member; of the sections 1 1ª, the two sections having a like construction and held to oppose each other, each section having an apertured hub adapted to rock freely upon the rod-spindle, each section having a recess in the outer edge surrounding its hub, the front faces of the sections having dovetailed side flanges; a wear-block having a dovetailed flange to engage with the side flanges of the sections 1 1ª; the apertured friction-disks held in the recesses of the sections 1 1ª; the clamp-nuts 10 11, engaging the threaded portions of the spindle, said nuts and the disk having ball-races, the bearing-balls engaging said races, and the jam-nut 13, and the cap-nut engaging the supplemental spindle, all being arranged substantially as shown and for the purposes described.

WILLIAM ALONZO ALLEN.

Witnesses:
 EDWARD FRASER,
 J. L. FRASER.